US007323499B2

(12) United States Patent
Krohn

(10) Patent No.: US 7,323,499 B2
(45) Date of Patent: *Jan. 29, 2008

(54) UV CURABLE SILVER CHLORIDE COMPOSITIONS FOR PRODUCING SILVER COATINGS

(75) Inventor: Roy C. Krohn, Kimball, MI (US)

(73) Assignee: Allied Photochemical, Inc., Kimball, MI (US)

( * ) Notice: Subject to any disclaimer, the term of this patent is extended or adjusted under 35 U.S.C. 154(b) by 230 days.

This patent is subject to a terminal disclaimer.

(21) Appl. No.: 11/086,112

(22) Filed: Mar. 22, 2005

(65) Prior Publication Data

US 2005/0191586 A1 Sep. 1, 2005

Related U.S. Application Data

(63) Continuation of application No. 10/363,247, filed on Mar. 5, 2003, which is a continuation-in-part of application No. PCT/US01/42042, filed on Sep. 6, 2001, now Pat. No. 6,906,114.

(60) Provisional application No. 60/230,488, filed on Sep. 6, 2000.

(51) Int. Cl.
*C08F 2/46* (2006.01)
*C08F 2/50* (2006.01)

(52) U.S. Cl. ............ 522/81; 522/100; 522/12; 522/103; 522/168; 522/170; 522/178; 522/181; 522/182; 522/96; 522/90; 522/92; 522/97; 522/104; 522/107; 522/109; 522/110; 522/111; 522/112; 522/71; 427/508; 427/510; 427/512

(58) Field of Classification Search ............ 522/81, 522/100, 12, 103, 170, 178, 181, 182, 96, 522/90, 92, 97, 104, 107, 109, 110, 111, 112, 522/168, 71

See application file for complete search history.

(56) References Cited

U.S. PATENT DOCUMENTS

| 3,700,754 | A | 10/1972 | Schmitt et al. |
|---|---|---|---|
| 3,953,643 | A | 4/1976 | Cheung et al. |
| 3,968,056 | A | 7/1976 | Bolon et al. |
| 3,988,647 | A | 10/1976 | Bolon et al. |
| 4,049,844 | A | 9/1977 | Bolon et al. |
| 4,088,801 | A | 5/1978 | Bolon et al. |
| 4,113,894 | A | 9/1978 | Koch, II |
| 4,187,340 | A | 2/1980 | Oishi et al. |
| 4,188,449 | A | 2/1980 | Lu et al. |
| RE30,274 | E | 5/1980 | Bolon et al. |
| 4,256,591 | A | 3/1981 | Yamamoto et al. |
| 4,271,212 | A | 6/1981 | Stengle |
| 4,338,376 | A | 7/1982 | Kritzler |
| 4,391,858 | A | 7/1983 | Batzill |
| RE31,411 | E | 10/1983 | Bolon et al. |
| 4,420,500 | A | 12/1983 | Nakatani et al. |
| 4,439,494 | A | 3/1984 | Olson |
| 4,455,205 | A | 6/1984 | Olson et al. |
| 4,472,019 | A | 9/1984 | Bishop et al. |
| 4,478,876 | A | 10/1984 | Chung |
| 4,479,860 | A | 10/1984 | Hayase et al. |
| 4,495,042 | A | 1/1985 | Hayase et al. |
| 4,496,475 | A | 1/1985 | Abrams |
| 4,513,023 | A | 4/1985 | Wary |
| 4,533,445 | A | 8/1985 | Orio |
| 4,539,258 | A | 9/1985 | Panush |
| 4,547,410 | A | 10/1985 | Panush et al. |
| 4,551,361 | A | 11/1985 | Burzynski et al. |
| 4,557,813 | A | 12/1985 | Heil et al. |
| 4,557,975 | A | 12/1985 | Moore |
| 4,559,118 | A | 12/1985 | Heil et al. |
| 4,594,315 | A | 6/1986 | Shibue et al. |
| 4,609,612 | A | 9/1986 | Berner et al. |
| 4,640,981 | A | 2/1987 | Dery et al. |
| 4,665,342 | A | 5/1987 | Topp et al. |
| 4,666,783 | A | 5/1987 | Heil et al. |
| 4,666,821 | A | 5/1987 | Hein et al. |
| 4,684,353 | A | 8/1987 | deSouza |
| 4,738,899 | A | 4/1988 | Bluestein et al. |
| 4,788,108 | A | 11/1988 | Saunders, Jr. et al. |
| D298,917 | S | 12/1988 | Krohn |
| 4,806,257 | A | 2/1989 | Clark et al. |
| 4,814,208 | A | 3/1989 | Miyazaki et al. |
| 4,816,717 | A | 3/1989 | Harper et al. |
| 4,822,646 | A | 4/1989 | Clark et al. |
| 4,828,758 | A | 5/1989 | Gillberg-Laforce et al. |
| 4,877,512 | A | 10/1989 | Bowns et al. |
| 4,900,763 | A | 2/1990 | Kraushaar |
| 4,911,796 | A | 3/1990 | Reed |
| 4,959,178 | A | 9/1990 | Frentzel et al. |

(Continued)

FOREIGN PATENT DOCUMENTS

DE 198 35 917 A1 2/2000

(Continued)

*Primary Examiner*—Sanza L McClendon
(74) *Attorney, Agent, or Firm*—Brooks Kushman P.C.

(57) ABSTRACT

The present invention discloses an ultraviolet light curable silver chloride composition and method for making such a composition that may be used to produce an silver coating on a substrate. The disclosed composition does not contain any significant amount of volatile organic solvents that do not become incorporated in the active layer after curing.

20 Claims, No Drawings

U.S. PATENT DOCUMENTS

| | | | |
|---|---|---|---|
| 4,960,614 A | 10/1990 | Durand | |
| 4,964,948 A | 10/1990 | Reed | |
| 4,975,471 A | 12/1990 | Hayase et al. | |
| 5,006,397 A | 4/1991 | Durand | |
| 5,049,480 A | 9/1991 | Nebe et al. | |
| 5,068,714 A | 11/1991 | Seipler | |
| 5,076,963 A | 12/1991 | Kameyama et al. | |
| 5,100,848 A | 3/1992 | Enomoto et al. | |
| 5,104,929 A | 4/1992 | Bilkadi | |
| 5,116,639 A | 5/1992 | Kolk et al. | |
| 5,128,387 A | 7/1992 | Shustack | |
| 5,128,391 A | 7/1992 | Shustack | |
| 5,149,971 A | 9/1992 | McElhaney et al. | |
| 5,180,523 A | 1/1993 | Durand et al. | |
| 5,180,757 A | 1/1993 | Lucey | |
| 5,183,831 A | 2/1993 | Bielat et al. | |
| 5,221,560 A | 6/1993 | Perkins et al. | |
| 5,225,170 A | 7/1993 | Kolk et al. | |
| 5,258,225 A | 11/1993 | Katsamberis | |
| 5,282,985 A | 2/1994 | Zabinski et al. | |
| 5,296,295 A | 3/1994 | Perkins et al. | |
| 5,326,636 A | 7/1994 | Durand et al. | |
| 5,356,545 A | 10/1994 | Wayte | |
| 5,384,160 A | 1/1995 | Frazzitta | |
| 5,395,876 A | 3/1995 | Frentzel et al. | |
| 5,424,182 A | 6/1995 | Marginean, Sr. et al. | |
| 5,453,451 A | 9/1995 | Sokol | |
| 5,454,892 A | 10/1995 | Kardon et al. | |
| 5,462,701 A | 10/1995 | Hagemeyer et al. | |
| 5,470,643 A | 11/1995 | Dorfman | |
| 5,470,897 A | 11/1995 | Meixner et al. | |
| 5,514,214 A | 5/1996 | Joel et al. | |
| 5,523,143 A | 6/1996 | Hagemeyer et al. | |
| 5,556,527 A | 9/1996 | Igarashi et al. | |
| 5,561,730 A | 10/1996 | Lochkovic et al. | |
| 5,565,126 A | 10/1996 | Kimura et al. | |
| 5,587,433 A | 12/1996 | Boeckeler | |
| 5,596,024 A | 1/1997 | Horie et al. | |
| 5,609,918 A | 3/1997 | Yamaguchi et al. | |
| 5,624,486 A | 4/1997 | Schmid et al. | |
| 5,633,037 A | 5/1997 | Mayer | |
| 5,686,792 A | 11/1997 | Ensign, Jr. | |
| 5,691,417 A | 11/1997 | Bremer et al. | |
| 5,698,310 A | 12/1997 | Nakamura et al. | |
| 5,716,551 A | 2/1998 | Unruh et al. | |
| 5,718,950 A | 2/1998 | Komatsu et al. | |
| 5,747,115 A | 5/1998 | Howell et al. | |
| 5,750,186 A | 5/1998 | Frazzitta | |
| 5,773,487 A | 6/1998 | Sokol | |
| 5,784,197 A | 7/1998 | Frey et al. | |
| 5,787,218 A | 7/1998 | Ohtaka et al. | |
| 5,833,724 A | 11/1998 | Wei et al. | |
| 5,837,745 A | 11/1998 | Safta et al. | |
| 5,866,628 A | 2/1999 | Likavec et al. | |
| 5,871,827 A | 2/1999 | Jaffe et al. | |
| 5,883,148 A | 3/1999 | Lewandowski et al. | |
| 5,888,119 A | 3/1999 | Christianson et al. | |
| 5,914,162 A | 6/1999 | Bilkadi | |
| 5,942,284 A | 8/1999 | Hiskes et al. | |
| 5,945,502 A | 8/1999 | Hsieh et al. | |
| 5,950,808 A | 9/1999 | Tanabe et al. | |
| 5,968,996 A | 10/1999 | Sanchez et al. | |
| 5,994,424 A | 11/1999 | Safta et al. | |
| 6,054,501 A | 4/2000 | Taniguchi et al. | |
| 6,165,386 A | 12/2000 | Endo et al. | |
| 6,211,262 B1 | 4/2001 | Mejiritski et al. | |
| 6,261,645 B1 | 7/2001 | Betz et al. | |
| 6,262,140 B1 | 7/2001 | Savant et al. | |
| 6,267,645 B1 | 7/2001 | Burga et al. | |
| 6,290,881 B1 | 9/2001 | Krohn | |
| 6,444,713 B1 | 9/2002 | Pachl et al. | |
| 6,500,877 B1 | 12/2002 | Krohn | |
| 6,509,389 B1 | 1/2003 | Krohn | |
| 6,713,000 B2 | 3/2004 | Krohn | |
| 6,716,893 B2 | 4/2004 | Krohn | |
| 6,767,577 B1 | 7/2004 | Krohn | |
| 6,784,223 B2 | 8/2004 | Krohn | |
| 6,805,917 B1 | 10/2004 | Krohn | |
| 6,897,248 B2 | 5/2005 | Krohn | |
| 6,906,114 B2 * | 6/2005 | Krohn | 522/81 |
| 2001/0008906 A1 | 7/2001 | Chawla | |
| 2001/0050357 A1 | 12/2001 | Krohn | |
| 2003/0017954 A1 | 1/2003 | Krohn | |
| 2003/0022957 A1 | 1/2003 | Krohn | |
| 2003/0044547 A1 | 3/2003 | Krohn | |
| 2003/0045596 A1 | 3/2003 | Krohn | |
| 2003/0053781 A1 | 3/2003 | Fabian | |
| 2003/0069324 A1 | 4/2003 | Sakano et al. | |
| 2003/0082305 A1 | 5/2003 | Krohn | |
| 2003/0119933 A1 | 6/2003 | Krohn | |
| 2003/0162859 A1 | 8/2003 | Krohn | |
| 2004/0005415 A1 | 1/2004 | Krohn | |
| 2004/0106718 A1 | 6/2004 | Krohn | |
| 2004/0167242 A1 | 8/2004 | Krohn | |
| 2005/0008973 A1 | 1/2005 | Krohn | |
| 2005/0101685 A1 | 5/2005 | Krohn | |
| 2005/0101686 A1 | 5/2005 | Krohn | |

FOREIGN PATENT DOCUMENTS

| | | |
|---|---|---|
| EP | 0 081 323 A1 | 6/1983 |
| EP | 0 540 884 | 10/1992 |
| EP | 0 530 141 A1 | 3/1993 |
| EP | 0 567 940 A1 | 11/1993 |
| EP | 0 711 801 A2 | 5/1996 |
| EP | 0 820 217 A1 | 1/1998 |
| GB | 1 550 382 | 8/1979 |
| JP | 61203108 A | 9/1986 |
| JP | 4267097 A | 9/1992 |
| JP | 5279436 A | 10/1993 |
| JP | 5311103 A | 11/1993 |
| JP | 6016721 A | 1/1994 |
| WO | WO 97/31051 | 8/1997 |
| WO | WO 97/45458 | 12/1997 |
| WO | WO 98/40171 | 9/1998 |
| WO | WO 98/47954 | 10/1998 |
| WO | WO 98/50317 | 11/1998 |
| WO | WO 00/62586 | 10/2000 |

* cited by examiner

UV CURABLE SILVER CHLORIDE COMPOSITIONS FOR PRODUCING SILVER COATINGS

CROSS-REFERENCE TO RELATED APPLICATION

This application is a continuation-in-part of U.S. application Ser. No. 10/363,247 filed Mar. 5, 2003, now U.S. Pat. No. 6,906,114 which is the U.S. national phase of PCT Application Number PCT/US01/42042, filed Sep. 6, 2001 and published in English under PCT Article 21(2), which further claims the benefit of U.S. Provisional Application Ser. No. 60/230,488, filed Sep. 6, 2000. Each of these applications is hereby incorporated by reference.

TECHNICAL FIELD

The present invention relates to ultraviolet light (UV) curable silver chloride compositions capable of producing silver coatings.

BACKGROUND OF THE INVENTION

Silver-containing compounds and pure silver are typically applied to a substrate through coating, plating or layering. An example of such applications is the electrode plating of switches on pressure-sensitive modules and control panels. This process of plating is used on components for appliances such as microwave and conventional ovens. In the field of semiconductor fabrication art, silver plating is applied to silicon and germanium semiconductor wafers as silver metalizations. Further, silver coatings have been applied to polyester, polycarbonate, vinyl, ceramic and glass substrates.

The predominant approach for applying silver to a substrate involves depositing a solvent-based silver solution on the substrate, and subsequently chemically or thermally curing the solution, thus evaporating the solvent. The result of this process is to leave a solid silver plating on the substrate.

This approach suffers from numerous disadvantages. One important concern is the toxicity of the solvents currently utilized during the conventional process. These solvents require careful handling, specialized disposal facilities and techniques. As a result, the costs associated with the use of these toxic solvents are exceedingly high. The workers who handle these toxic solvents open themselves up to substantial health hazards even with strict adherence to the safety guidelines concerning handling and disposal. Another disadvantage is the difficulty of predicting the uniformity and thickness of the resultant silver plating after the solvent has evaporated. As a result, the quality and performance of the coating varies widely.

Accordingly, there exists a need to provide safe silver coating compositions which exhibit improved appearance and durability. Additionally, there is a need to provide a method of applying an improved composition which furthers the goals of safety and improved performance.

SUMMARY OF INVENTION

It is an object of the present invention is to provide a silver chloride composition and method in which silver can be disposed on a substrate without requiring a toxic solvent.

It is another object of the invention is to provide a silver chloride composition and method in which deposition of the silver layer is accomplished quickly and efficiently.

It is yet another object of the invention is to provide a silver chloride composition and method in which a silver coating with a predictable and uniform layer thickness is created.

It is still another object of the present invention to provide an improved silver chloride composition that can be applied by spraying, screen printing, dipping, and brushing.

The present invention discloses an ultraviolet light curable silver chloride composition and method for making such a composition that may be used to produce a silver layer. The disclosed composition does not contain any significant amount of volatile organic solvents that do not become incorporated in the silver layer after curing. Specifically, the silver chloride composition contains 5 weight percent, based on the total weight of the silver chloride composition, or less volatile organic solvents by weight.

In accordance with one aspect of the invention, an ultraviolet light curable silver chloride composition is provided. The silver chloride composition comprises a photocurable organic mixture, silver powder, silver chloride powder, and a photoinitiator. The photocurable mixture of the silver chloride composition comprises an acrylated epoxy oligomer in an amount of about 1 to 25 weight percent, based on the total weight of the silver chloride composition, an isobornyl acrylate monomer in an amount of about 2 to 16 weight percent, based on the total weight of the silver chloride composition, and optionally, an aliphatic acrylated oligomer in an amount of about 0.1 to 15 weight percent, based on the total weight percent of the silver chloride composition, and a flow promoting agent in an amount of 0.1 to 6 weight percent, based on the total weight of the silver chloride composition. Furthermore, the photoinitiator is preferably present in an amount of about 1 to 15 weight percent, based on the total weight of the silver chloride composition, the silver chloride powder is preferably present in an amount of about 30 to 50 weight percent, based on the total weight of the silver chloride composition and the silver metal powder is preferably present in an amount of about 20 to 60 weight percent, based on the total weight of the silver chloride composition.

In accordance with yet another aspect of the invention, a method is provided for depositing a silver coating on a substrate. The method comprises a first step of applying to the substrate a silver chloride fluid-phase composition ("silver chloride composition"). The silver chloride composition comprises the silver chloride composition disclosed above.

The method also includes a second step of illuminating the silver composition on the substrate with an ultraviolet light to cause the silver composition to cure into the silver coating.

In accordance with this method, the silver chloride composition can be selectively deposited on the substrate at specific locations where silver plating is desired. It need not be applied to the entire substrate.

BEST MODE FOR CARRYING OUT THE INVENTION

Silver Chloride Compositions

Reference will now be made in detail to presently preferred compositions or embodiments and methods of the invention, which constitute the best modes of practicing the invention presently known to the inventor.

In accordance with one aspect of the invention, a presently preferred ultraviolet light curable silver chloride composition is provided. The silver chloride composition comprises a photocurable organic mixture, silver powder, silver chloride powder, and a photoinitiator. In this preferred embodiment, the photocurable organic mixture includes an acrylated epoxy oligomer. The acrylated epoxy oligomer is preferably present in an amount of about 1 to 25 weight percent, based on the total weight of the silver chloride composition. If the silver chloride composition does not contain an aliphatic acrylated oligomer, the acrylated epoxy oligomer is more preferably present in an amount of about 10 to 18 weight percent, based on the total weight of the silver chloride composition, and most preferably about 14 weight percent, based on the total weight of the silver chloride composition. If the silver chloride composition contains an aliphatic acrylated oligomer, the acrylated epoxy oligomer is more preferably present in an amount of about 1 to 3 weight percent, based on the total weight of the silver chloride composition, and most preferably about 2 weight percent, based on the total weight of the silver chloride composition. Suitable acrylated epoxy oligomers include Radcure Ebecryl 3603 (novolac epoxy acrylate diluted 20% with tripropylent glycol diacrylate), commercially available from Radcure UCB Corp.; Sartomer CN-120 (difunctional bisphenol based epoxy acrylate) and CN-124 (difunctional bisphenol based epoxy acrylate), commercially available from Sartomer Corp.; and Echo Resin TME 9310 and 9345, commercially available from Echo Resins. The preferred acrylated epoxy oligomer is Ebecryl 3603, which is a tri-functional acrylated epoxy novolac. Combinations of these materials may also be employed herein.

The preferred photocurable organic mixture also optionally includes an aliphatic acrylated oligomer. The aliphatic acrylated oligomer, if present, is preferably present in an amount of about 0.1 to 15 weight percent, based on the total weight of the silver chloride composition. The aliphatic acrylated oligomer is more preferably present in an amount of about 4 to 10 weight percent, based on the total weight of the silver chloride composition, and most preferably about 7 weight percent, based on the total weight of the silver chloride composition. The aliphatic acrylated oligomer preferably comprises a urethane oligomer. Suitable aliphatic acrylated oligomers include Radcure Ebecryl 244 (aliphatic urethane diacrylate diluted 10% with 1,6-hexanediol diacrylate), Ebecryl 264 (aliphatic urethane triacrylate diluted 15% with 1,6-hexanediol diacrylate), Ebecryl 284 CN-966A80 (aliphatic urethane diacrylate blended with 20% tripropylene glycol diacrylate) urethanes, commercially available from Radcure UCB Corp. of Smyrna, Ga.; Sartomer CN-961E75 (aliphatic urethane diacrylate blended with 25% ethoxylated trimethylol propane triacylate), CN-961H81 (aliphatic urethane diacrylate blended with 19% 2(2-ethoxyethoxy)ethyl acrylate), CN-963A80 (aliphatic urethane diacrylate blended with 20% tripropylene glycol diacrylate), CN-964 (aliphatic urethane diacrylate), CN-966A80 (aliphatic urethane diacrylate blended with 20% tripropylene glycol diacrylate), CN-982A75 (aliphatic urethane diacrylate blended with 25% tripropylene glycol diacrylate) and CN-983 (aliphatic urethane diacrylate), commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate of 1200 molecular weight supplied as an 85% solution in hexanediol diacrylate. Ebecryl 284 is aliphatic urethane diacrylate of 1200 molecular weight diluted 10% with 1,6-hexanediol diacrylate. Combinations of these materials may also be employed herein.

The preferred photocurable organic mixture further includes an ethylenically unsaturated monomer having Formula I:

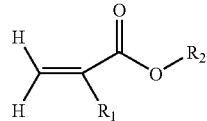

wherein $R_1$ is hydrogen or substituted or unsubstituted alkyl; and $R_2$ is substituted or unsubstituted alkyl having more than 4 carbon atoms, substituted or unsubstituted cycloalkyl, substituted or unsubstituted cycloalkenyl, or substituted or unsubstituted aryl. Preferably $R_1$ is hydrogen or methyl; and $R_2$ is isobornyl, phenyl, benzyl, dicyclopentenyl, cyclohexyl, 3,3,5-trimethyl cyclohexyl, dicyclopentenyl oxyethyl, and naphthyl. In some variations, the ethylenically unsaturated monomer is present in an amount from about 1 to about 20 weight percent, base on the total weight of the silver chloride composition. The most preferred ethylenically unsaturated monomers are isobornyl acrylate monomers. The isobornyl acrylate monomers are preferably present in an amount of about 2 to 16 weight percent, base on the total weight of the total weight of the silver chloride composition. If the silver chloride composition does not contain an aliphatic acrylated oligomer, the isobornyl acrylate monomer is more preferably present in an amount of about 6 to 10 weight percent, based on the total weight of the silver chloride composition, and most preferably about 8 weight percent, based on the total weight of the silver chloride composition. If the silver chloride composition contains an aliphatic acrylated oligomer, the isobornyl acrylate monomer is more preferably present in an amount of about 2 to 6 weight percent, based on the total weight of the silver chloride composition, and most preferably about 5 weight percent, based on the total weight of the silver chloride composition. Suitable isobornyl acrylate monomers include Sartomer SR-423 (isobornyl methacrylate) IBOMA and SR-506 (isobornyl acrylate) IBOA; Radcure IBOA (isobornyl acrylate), commercially available from Radcure Corp.; IBOA and IBOMA, commercially available from CPS Chemical; and Genomer 1121, commercially available from Rahn Radiation Curing. The preferred isobornyl acrylate monomers is Radcure IBOA, commercially available from Radcure Corp. Combinations of these materials may also be employed herein.

The preferred photocurable organic mixture optionally includes a flow promoting agent preferably present in an amount of about 0.1 to 6 weight percent, based on the total weight of the silver chloride composition. The flow promoting agent is more preferably present in an amount of about 0.1 to 2 weight percent, based on the total weight of the silver chloride composition, and most preferably about 0.7 weight percent, based on the total weight of the silver chloride composition. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

The silver chloride composition also includes a silver chloride powder preferably present in an amount of about 30 to 50 weight percent, based on the total weight of the silver chloride composition. The silver chloride powder is more preferably present in an amount of about 35 to 45 weight percent, based on the total weight of the silver chloride composition, and most preferably about 40 weight percent, based on the total weight of the silver chloride composition. The silver powder comprises a plurality of particles. In this preferred silver chloride composition, the silver powder has a particle size range for these particles of about 4 microns to about 18 microns. Preferably, the silver chloride powder particles have a particle size distribution wherein about 10 percent, based on the total number of the silver chloride powder particles, have a particle size of less than about 4 microns, about 50 percent of the particles have a particle size of less than about 8 microns, and about 90 percent of the particles have a particle size of less than about 18 microns. The preferred silver chloride powder RDAGCL50 is available from Degussa Corp. of South Plainfield, N.J.

The silver chloride composition also includes a silver powder preferably present in an amount of about 20 to 60 weight percent, based on the total weight of the silver chloride composition. If the silver chloride composition does not contain an aliphatic acrylated oligomer, the silver powder is more preferably present in an amount of about 25 to 45 weight percent, based on the total weight of the silver chloride composition, and most preferably about 32 weight percent, based on the total weight of the silver chloride composition. If the silver chloride composition contains an aliphatic acrylated oligomer, the silver powder is more preferably present in an amount of about 30 to 50 weight percent, based on the total weight of the silver chloride composition, and most preferably about 41 weight percent, based on the total weight of the silver chloride composition. The silver powder comprises a plurality of particles. In this preferred silver chloride composition, the silver powder has a particle size range for these particles of about 5 microns to about 15 microns. Preferably, the silver powder particles have a particle size distribution wherein about 10 percent, based on the total number of the silver powder particles, have a particle size of less than about 4.7 microns, about 50 percent of the particles have a particle size of less than about 7.6 microns, and about 90 percent of the particles have a particle size of less than about 14.9 microns. The preferred silver powders are Silver Powder EG-ED and Silver Powder C-ED commercially available from Degussa Corp. of South Plainfield, N.J.

The silver chloride composition also includes a photoinitiator preferably present in an amount of about 1 to 15 weight percent, based on the total weight of the silver chloride composition. The photoinitiator is more preferably present in an amount of about 2 to 7 weight percent, based on the total weight of the silver chloride composition, and most preferably about 5 weight percent, based on the total weight of the silver chloride composition. Suitable photoinitiators include Irgacure 184 (1-hydroxycyclohexyl phenyl ketone), Irgacure 907 (2-methyl-1-[4-(methylthio)phenyl]-2-morpholino propan-1-one), Irgacure 369 (2-benzyl-2-N,N-dimethylamino-1-(4-morpholinophenyl)-1-butanone), Irgacure 500 (the combination of 1-hydroxy cyclohexyl phenyl ketone and benzophenone), Irgacure 651 (2,2-dimethoxy-2-phenyl acetophenone), Irgacure 1700 (the combination of bis(2,6-dimethoxybenzoyl-2,4-,4-trimethyl pentyl phosphine oxide and 2-hydroxy-2-methyl-1-phenyl-propan-1-one), Ciba-Geigy 1700, and DAROCUR 1173 (2-hydroxy-2-methyl-1-phenyl-propan-1-one) and 4265 (the combination of 2,4,6 trimethylbenzoyldiphenyl-phosphine oxide and 2-hydroxy 2-methyl-1-phenyl-propan-1-one), available commercially from Ciba-Geigy Corp., Tarrytown, N.Y.; CYRACURE UVI-6974 (mixed triaryl sulfonium hexafluoroantimonate salts) and CYRACURE UVI-6990 (mixed triaryl sulfonium hexafluorophosphate salts) available commercially from Union Carbide Chemicals and Plastics Co. Inc., Danbury, Conn.; and Genocure CQ, Genocure BOK, and Genocure M.F., commercially available from Rahn Radiation Curing. The preferred photoinitiator is Irgacure 1700 commercially available from Ciba-Geigy of Tarrytown, N.Y. Combinations of these materials may also be employed herein.

To illustrate, the following example sets forth a presently preferred silver composition according to this aspect of the invention.

EXAMPLE 1

This example provides a preferred silver chloride composition according to the invention. The silver chloride composition was made from the following components:

| Component | Approximate Weight % |
| --- | --- |
| IBOA | 8.4 |
| Irgacure 1700 | 4.6 |
| Ebecryl 3603 | 13.7 |
| Modaflow | 0.7 |
| Silver Chloride powder - RDAGCL50 | 40.3 |
| Washed Silver powder - EGED | 32.3 |
| Total | 100.00 |

In this example the IBOA and Iragure 1700 are mixed in a pan with a propeller blade mixer for 30 seconds at a speed of 500 to 1000 rpm. Next, the Ebecryl 3603 and the Modaflow are introduced into the pan and mixed for 1 to 2 minutes at a speed of 1000 rpm. In the next step, the EGED silver powder and the silver chloride powder are introduced into the pan and are mixed for 1 to 2 minutes at a speed of 1000 rpm. Finally, the mixing speed is increased to 10,000 rpm and mixed for an additional 5 minutes.

For best results, the silver powder is washed prior to addition to the mixture. The washing process includes a first step of loading the powder in a sealable container. A mixture consisting of 17 weight percent, based on the total weight of the silver chloride composition, methyl ethyl ketone and 83 weight percent, based on the total weight of the silver chloride composition, silver chloride composition is added to the container and the slurry is mixed with a propeller blade for 5 minutes at 500 rpm. The methyl ethyl ketone is poured off and the silver powder is allowed to air dry. During the drying stage the powder is periodically mixed.

EXAMPLE 2

This example provides a preferred silver chloride composition according to the invention. The silver chloride composition was made from the following components:

| Component | Approximate Weight % |
|---|---|
| IBOA | 4.7 |
| Irgacure 1700 | 3.9 |
| Ebecryl 264 | 7.2 |
| Ebecryl 3603 | 2.4 |
| Modaflow | 0.8 |
| Silver Chloride powder - RDAGCL50 | 40.0 |
| Washed Silver powder - EGED | 41.0 |
| Total | 100.00 |

In this example the IBOA and Iragure 1700 are mixed in a pan with a propeller blade mixer for 30 seconds at a speed of 500 to 1000 rpm. Next, the Ebecryl 264, the Ebecryl 3603, and the Modaflow are introduced into the pan and mixed for 1 to 2 minutes at a speed of 1000 rpm. In the next step, the EGED silver powder and the silver chloride powder are introduced into the pan and are mixed for 1 to 2 minutes at a speed of 1000 rpm. Finally, the mixing speed is increased to 10,000 rpm and mixed for an additional 5 minutes.

For best results, the silver powder is washed prior to addition to the mixture. The washing process includes a first step of loading the powder in a sealable container. A mixture consisting of 17 weight percent methyl ethyl ketone and 83 weight percent silver powder composition is added to the container and the slurry is mixed with a propeller blade for 5 minutes at 500 rpm. The methyl ethyl ketone is poured off and the silver powder is allowed to air dry. During the drying stage the powder is periodically mixed.

Method for Depositing an Silver Coating on a Substrate

In accordance with still another aspect of the invention, a method is provided for depositing a silver coating on a suitable substrate. The method comprises a first step of applying a fluid-phase silver chloride composition to the substrate.

The preferred silver chloride composition comprises an acrylated epoxy oligomer in an amount of about 1 to 25 weight percent, based on the total weight of the silver chloride composition, an aliphatic acrylated oligomer in an amount of about 0.1 to 15 weight percent, based on the total weight of the silver chloride composition, an isobornyl acrylate monomer in an amount of about 2 to 16 weight percent, based on the total weight of the silver chloride composition, a photoinitiator in an amount of about 1 to 15 weight percent, based on the total weight of the silver chloride composition, a flow promoting agent in an amount of 0.1 to 6 weight percent, based on the total weight of the silver chloride composition, silver chloride powder in an amount of about 30 to 50 weight percent, based on the total weight of the silver chloride composition, and silver metal powder in an amount of about 20 to 60 weight percent, based on the total weight of the silver chloride composition. The preferred silver chloride compositions for use in accordance with this method are those described herein, for example, including the compositions described in example 1 and example 2.

The silver chloride composition may be applied to the substrate using a number of different techniques. The silver chloride composition may be applied, for example, by direct brush application, or it may be sprayed onto the substrate surface. It also may be applied using a screen printing technique. In such screen printing technique, a "screen" as the term is used in the screen printing industry is used to regulate the flow of liquid composition onto the substrate surface. The silver composition typically would be applied to the screen as the latter contacts the substrate. The silver chloride composition flows through the silk screen to the substrate, whereupon it adheres to the substrate at the desired film thickness. Screen printing techniques suitable for this purpose include known techniques. However, the process is adjusted in ways known to persons of ordinary skill in the art to accommodate the viscosity, flowability, and other properties of the liquid-phase composition, the substrate and its surface properties, etc. Flexographic techniques, for example, using pinch rollers to contact the silver chloride composition with a rolling substrate, also may be used.

The method includes a second step of illuminating the silver fluid-phase composition on the substrate with an ultraviolet light to cause the silver fluid-phase composition to cure into the silver coating. This illumination may be carried out in any number of ways, provided the ultraviolet light or radiation impinges upon the silver composition so that the silver composition is caused to polymerize to form the coating, layer, film, etc., and thereby cures.

Curing preferably takes place by free radical polymerization, which is initiated by an ultraviolet radiation source. The photoinitiator preferably comprises a photoinitiator, as described above.

Various ultraviolet light sources may be used, depending on the application. Preferred ultraviolet radiation sources for a number of applications include known ultraviolet lighting equipment with energy intensity settings of, for example, 125 watts, 200 watts, and 300 watts per square inch.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A photocurable silver chloride composition comprising:
   a photocurable organic mixture;
   a photoinitiator;
   silver powder; and
   silver chloride powder;
   wherein the photocurable organic mixture comprises:
   an ethylenically unsaturated monomer having Formula I:

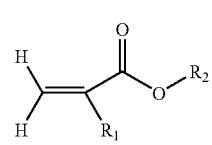

wherein $R_1$ is hydrogen or substituted or unsubstituted alkyl; and $R_2$ is a substituted or unsubstituted alkyl having more than 4 carbon atoms, a substituted or unsubstituted cycloalkyl, a substituted or unsubstituted alkyl cycloalkenyl, or a substituted or unsubstituted aryl.

2. The silver chloride composition of claim 1 wherein $R_1$ is hydrogen or methyl; and $R_2$ is isobornyl, phenyl, benzyl, dicyclopentenyl, cyclohexyl, 3,3,5-trimethyl cyclohexyl, dicyclopentenyl oxyethyl, and naphthyl.

3. The silver chloride composition of claim 1 wherein the photocurable organic mixture further comprises an acrylated epoxy oligomer.

4. The silver chloride composition of claim 3 wherein the acrylated epoxy oligomer is selected from the group consisting of:
novolac epoxy acrylate diluted 20 weight percent by weight with tripropylene glycol diacrylate;
difunctional bisphenol based epoxy acrylate; and
mixtures thereof.

5. The silver chloride composition of claim 3 wherein the acrylated epoxy oligomer is present in an amount of about 1 to 25 weight percent, based on the total weight of the silver chloride composition.

6. The silver chloride composition of claim 1 wherein the ethylenically unsaturated monomer comprises an isobornyl acrylate monomer present in an amount of about 2 to 16 weight percent, based on the total weight of the silver chloride composition.

7. The silver chloride composition of claim 1 wherein the silver powder is present in an amount of about 20 to 60 weight percent, based on the total weight of the silver chloride composition.

8. The silver chloride composition of claim 1 wherein the silver chloride powder is present in an amount of about 30 to 50 weight percent, based on the total weight of the silver chloride composition.

9. The silver chloride composition of claim 1 wherein the photoinitiator is present in an amount of about 1 to 15 weight percent, based on the total weight of the silver chloride composition.

10. The silver chloride composition of claim 1 further comprising a flow promoting agent.

11. The silver chloride composition of claim 1 further comprising an aliphatic acrylated oligomer.

12. The silver chloride composition of claim 11 wherein the aliphatic acrylated oligomer is an aliphatic acrylated urethane oligomer.

13. The silver chloride composition of claim 12 wherein the aliphatic acrylated urethane oligomer is selected from the group consisting of:
a) aliphatic urethane diacrylate diluted 10 weight percent by weight with 1,6-hexanediol diacrylate;
b) aliphatic urethane triacrylate diluted 15 weight percent by weight with 1,6-hexanediol diacrylate);
c) aliphatic urethane diacrylate blended with 20 weight percent by weight tripropylene glycol diacrylate;
d) aliphatic urethane diacrylate blended with 25 weight percent by weight ethoxylated trimethylol propane triacrylate;
e) aliphatic urethane diacrylate blended with 19 weight percent by weight 2(2-ethoxyethoxy)ethyl acrylate;
f) aliphatic urethane diacrylate blended with 20 weight percent by weight tripropylene glycol diacrylate;
g) aliphatic urethane diacrylate blended with 20 weight percent by weight tripropylene glycol diacrylate;
h) aliphatic urethane diacrylate blended with 25 weight percent by weight tripropylene glycol diacrylate;
i) aliphatic urethane diacrylate; and
j) mixtures thereof.

14. The silver chloride composition of claim 12 wherein the aliphatic acrylated oligomer is present in an amount of about 0.1 to 15 weight percent, based on the total weight of the silver chloride composition.

15. A photocurable silver chloride composition comprising:
a photocurable organic mixture;
a photoinitiator;
silver powder; and
silver chloride powder;
wherein the photocurable organic mixture comprises:
an acrylated epoxy oligomer; and
an ethylenically unsaturated monomer having Formula I:

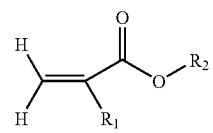

wherein $R_1$ is hydrogen or substituted or unsubstituted alkyl; and $R_2$ is substituted or unsubstituted alkyl having more than 4 carbon atoms, a substituted or unsubstituted cycloalkyl; a substituted or unsubstituted alkyl cycloalkenyl, or a substituted or unsubstituted aryl.

16. The silver chloride composition of claim 15 wherein $R_1$ is hydrogen or methyl; and $R_2$ is isobornyl, phenyl, benzyl, dicyclopentenyl, cyclohexyl, 3,3,5-trimethyl cyclohexyl, dicyclopentenyl oxyethyl, and naphthyl.

17. The silver chloride composition of claim 15 wherein the ethylenically unsaturated monomer comprises an isobornyl monomer.

18. The silver chloride composition of claim 17 wherein:
the acrylated epoxy oligomer is present in an amount of about 1 to 25 weight percent, based on the total weight of the silver chloride composition;
the isobornyl acrylate monomer present in an amount of about 2 to 16 weight percent, based on the total weight of the silver chloride composition;
the silver powder is present in an amount of about 20 to 60 weight percent, based on the total weight of the silver chloride composition;
the silver chloride powder is present in an amount of about 30 to 50 weight percent, based on the total weight of the silver chloride composition; and
the photoinitiator is present in an amount of about 1 to 15 weight percent, based on the total weight of the silver chloride composition.

19. The silver chloride composition of claim 18 further comprising an aliphatic acrylated oligomer.

20. The silver chloride composition of claim 19 wherein the aliphatic acrylated oligomer is present in an amount of about 0.1 to 15 weight percent, based on the total weight of the silver chloride composition.

* * * * *